United States Patent [19]

Gastinger et al.

[11] Patent Number: 5,070,141

[45] Date of Patent: * Dec. 3, 1991

[54] POLYACRYLATE GRAFT-POLYOL DISPERSANTS

[75] Inventors: Robert G. Gastinger, West Chester, Pa.; John E. Hayes, Wilmington, Del.

[73] Assignee: ARCO Chemical Technology, Inc., Wilmington, Del.

[*] Notice: The portion of the term of this patent subsequent to Jun. 4, 2008 has been disclaimed.

[21] Appl. No.: 226,329

[22] Filed: Jul. 29, 1988

[51] Int. Cl.$^5$ .................. C08L 51/08; C08L 33/08
[52] U.S. Cl. .................. 525/63; 525/412
[58] Field of Search .................. 525/63, 412, 330.3

[56] References Cited

U.S. PATENT DOCUMENTS

| | | | |
|---|---|---|---|
| 3,652,639 | 3/1972 | Pizzini et al. | 260/465.4 |
| 4,119,586 | 10/1978 | Shah | 521/137 |
| 4,148,840 | 4/1979 | Shah | 260/859 R |
| 4,242,249 | 12/1980 | Van Cleve et al. | 260/33.2 R |
| 4,242,776 | 12/1980 | Shah et al. | 524/368 |
| 4,327,005 | 4/1982 | Ramlow et al. | 524/377 |
| 4,334,049 | 6/1982 | Ramlow et al. | 526/202 |
| 4,390,645 | 6/1983 | Hoffman et al. | 521/137 |
| 4,394,491 | 7/1983 | Hoffman | 525/452 |
| 4,460,715 | 7/1984 | Hoffman et al. | 521/137 |
| 4,477,603 | 10/1984 | Fisk | 521/137 |
| 4,513,124 | 4/1985 | Hoffman | 525/452 |
| 4,640,935 | 2/1987 | Fisk et al. | 521/137 |
| 4,745,153 | 5/1988 | Hoffman | 524/762 |
| 4,797,459 | 1/1989 | Cuscorida | 524/368 |

FOREIGN PATENT DOCUMENTS

WO87 03886 7/1987 PCT Int'l Appl. .

Primary Examiner—John C. Bleutge
Assistant Examiner—R. Dean, Jr.
Attorney, Agent, or Firm—David L. Mossman; Dennis M. Kozak

[57] ABSTRACT

Polyacrylate graft-polyols are found to be homogeneous liquids useful as dispersants in vinyl polymer polyols. The novel polyacrylate graft-polyols are made by polymerizing at least one acrylate monomer in a polyol where the resultant polyacrylate is soluble in the polyol used. The polyol may be a polyoxyalkylene polyether polyol. No copolymer or unsaturated polyol is required to make vinyl polymer polyols having high styrene/acrylonitrile ratios, good stability and improved viscosity properties when these polyacrylate graft-polyol dispersants are employed. The vinyl polymer polyols are in turn useful in reactions with polyisocyanates in the presence of suitable catalysts to make polyurethane products.

36 Claims, No Drawings

POLYACRYLATE GRAFT-POLYOL DISPERSANTS

CROSS-REFERENCE TO RELATED APPLICATION

This application is related to U.S. patent application Ser. No. 07/226,347, filed of even date, relating to polyol polyacrylate dispersants.

FIELD OF THE INVENTION

The invention relates to the synthesis and use of polyacrylate graft-polyols, and, in one aspect, more particularly relates to polyacrylate graft-polyols useful as dispersants, made by polymerizing at least one acrylate monomer or polymer in a polyol where the resultant polyacrylate is soluble in the polyol employed.

BACKGROUND OF THE INVENTION

The use of a polyol in the preparation of polyurethanes by reaction of the polyol with a polyisocyanate in the presence of a catalyst and perhaps other ingredients is well known. Conventional polyols for flexible polyurethane foams, such as slab urethane foams, are usually made by the reaction of a polyhydric alcohol with an alkylene oxide, usually ethylene oxide and/or propylene oxide, to a molecular weight of about 2,000 to 5,000 and above. These polyols are then reacted with polyisocyanate in the presence of water or other blowing agents such as fluorocarbons to obtain polyurethane foams. Polyols have been modified in many ways in attempts to improve the properties of the resulting polyurethane, for example, by using a polymer polyol as the polyol component. Conventional polyols may be used as the dispersing media or base polyol in these polymer polyols.

For example, dispersions of polymers of vinyl compounds such as styrene, acrylonitrile or a mixture of the two (abbreviated as SAN monomers), or of polyurea polymers, such as those prepared from toluene diisocyanate (TDI) and hydrazine in conventional polyols have been included to improve the properties of the polyols, and thus, the properties of the resulting foam. Polyurethane foams with higher load bearing properties (ILD—indentation load deflection, and CFD—compression force deflection) may be produced in this manner. It would be desirable if polymer polyols could be prepared which would be stable and have low viscosities. Stability is important to the storage life of the polyols before they are used to make the polyurethane foams. The tendency of polymer polyols to undergo phase separation if they are not stabilized is well known. Low viscosities and small particle sizes are also important in a good quality polyol to permit it to be pumped easily in high volume foam producing equipment.

It would further be desirable if styrene/acrylonitrile polymer polyols could be synthesized which would have large SAN ratios. The substitution of styrene for acrylonitrile in these polymer polyols helps prevent discoloration during the cure of the polyurethane, and also helps improve flame retardability of the resultant foams. However, the stability of the polymer polyols decreases with increasing styrene to acrylonitrile ratios. Viscosity and particle size are also typically adversely affected with high styrene contents.

U.S. Pat. No. 4,148,840 to Shah and U.S. Pat. No. 4,242,249 to Van Cleve, et al. describe the use of preformed polymer polyols as dispersion stabilizers in the synthesis of SAN dispersion polyols. U.S. Pat. No. 4,148,840 describes preformed polymer polyol stabilizers which have a viscosity of less than 40,000 cps at 25° C. These materials are viscous dispersions or semi-solids, which are difficult to work with. The polyols suggested therein for the preformed polymer polyol and the final polymer polyol may be the same or different, and may be of a wide variety. The monomers were also suggested from a lengthy list, although only SAN copolymers are discussed in detail. The preformed stabilizers in U.S. Pat. No. 4,242,249 are graft or addition copolymers having an anchor portion of a polymer or ethylenically unsaturated monomer of a mixture of monomers chemically bonded to a solvatable portion of a propylene oxide polymer, where the preformed stabilizer again has a viscosity in excess of 40,000 cps at 25° C.

U.S. Pat. Nos. 4,327,005 and 4,334,049 to Ramlow, et al. teach alkylene oxide adducts of styrene/allyl alcohol copolymers as preformed stabilizers for polymer polyols. The stabilizer may take the form of a graft copolymer dispersion or a finely divided solid polymer.

Further, Pizzini, et al. in U.S. Pat. No. 3,652,639 describe the use of graft copolymers of acrylonitrile and an unsaturated polyol which are homogeneous, transparent liquids which may be employed directly in the preparation of flexible polyurethane foams. The unsaturated polyol is obtained by reacting an organic compound having both ethylenic unsaturation and a hydroxyl, carboxyl, or epoxy group with a polyol. A number of additional patents also teach the use of an acryloyl capped unsaturated polyol copolymerized with styrene and acrylonitrile to produce polymer polyols. These patents include U.S. Pat. Nos. 4,460,715; 4,477,603; 4,640,935; 4,513,124; 4,394,491; and 4,390,645.

More recently, International Publication No. WO 87/03886 and U.S. Pat. No. 4,745,153 teach the homo- or co-polymerization of vinyl-terminated polyol adducts alone or together with an ethylenically unsaturated monomer or monomer mixture in the presence of an active hydrogen-containing compound as a solvent, and their use as preformed dispersants.

It is well known in the art that high styrene content polymer polyols are desirable, but difficult to prepare in stable form. It has been discovered that polyacrylate graft-polyols may be useful themselves as dispersants in preparing polymer polyols that have relatively high styrene contents, but which also had good stability, small particle sizes, and low viscosity as well.

SUMMARY OF THE INVENTION

Accordingly, it is an object of the present invention to provide stable, low viscosity polymer polyols of high styrene to acrylonitrile (SAN) ratios, and a method for making such polymer polyols. In one aspect of the invention, these SAN ratios may range from about 60/40 to about 85/15.

It is another object of the present invention to provide polyacrylate graft-polyols as dispersants to produce stable, low viscosity SAN polymer polyols.

Still another object of the invention to provide polyacrylate graft-polyols as dispersants for SAN polymer polyols where the dispersant is prepared from simple monomers and conventional polyols, and no unsaturated polyols or further alkoxylation is required in the dispersant preparation.

In carrying out these and other objects of the invention, there is provided, in one form, stable, low viscosity polymer polyols made by a process of polymerizing, via a free-radical reaction, a vinyl monomer component, in the presence of a polyol mixture comprising a major portion of a base polyol and a minor portion of a polyacrylate graft-polyol as a dispersant, where the polyacrylate graft-polyol dispersant is made by polymerizing at least one acrylate monomer in the presence of a polyol in which the resulting polymer is soluble.

In another aspect of the invention, the stable, low viscosity polymer polyol compositions have a continuous phase, a disperse phase within the continuous phase, and a dispersant for enhancing the stability of the polymer polyol. The disperse phase consists of vinyl polymer particles formed by polymerizing an ethylenically unsaturated monomer or mixture of monomers in the continuous phase. The continuous phase consists of a first polyoxyalkylene polyether polyol. Finally, the dispersant is a polyacrylate graft-polyol formed by polymerizing from about 5 to about 90 weight percent of at least one acrylate monomer that is selected from the group consisting of $C_1$–$C_{20}$ alkyl esters of acrylic and methacrylic acids in from about 95 to about 10 weight percent of a second polyoxyalkylene polyether polyol to form a single phase homogeneous liquid polyacrylate graft-polyol dispersant. The polyacrylate graft-polyol dispersant may be employed in an amount sufficient to enhance the stability of the resulting polymer polyol as compared to the stability of the polymer polyol in the absence of the polyacrylate graft-polyol dispersant.

DETAILED DESCRIPTION OF THE INVENTION

It has been surprisingly discovered that the use of single phase, homogeneous, liquid preformed polymer polyols can stabilize high styrene content SAN dispersion polyols. Additionally, unsaturated polyols are not required and no further alkoxylation after the initial reaction is needed. It is anticipated that any polymer polyol where the polymer portion is soluble in the polyol should have some degree of effectiveness. Most effective would be those whose polymer portion has some affinity, miscibility or other interaction with polymer component of the final polymer polyol.

The polyacrylate graft-polyol dispersants are prepared by the polymerization of at least one acrylate monomer or polymer in a polyol. Alternative methods may be employed. In one method, an in situ method, the polyacrylate graft-polyol dispersant is formed by polymerizing esters of acrylic and methacrylic acid in situ in a polyoxyalkylene polyether polyol to produce the polyacrylate graft-polyol.

The acrylate monomer used is preferably an ester which can be used singly or in combination, and in one aspect is a $C_1$ to $C_{20}$ alkyl ester of acrylic and methacrylic acids. They may have the formula:

$$CH_2 = CR^1CO_2R$$

where R is an alkyl group of one to twenty carbon atoms, such as methyl, ethyl propyl, n-butyl, etc.; and $R^1$ is hydrogen or methyl. Particularly suitable acrylate monomers include methyl acrylate, ethyl acrylate, propyl acrylate, N-butyl acrylate, and the like and their mixtures.

The polyol and the polymer formed therein made from at least one acrylate monomer must be selected such that the acrylate monomer, and any polymer produced therefrom, is soluble in the polyol. For the purposes of clarity, the polyol used in forming the final stable, low viscosity polymer polyols using a vinyl monomer component such as SAN, will be identified as the first polyol. In turn, the polyol used in the preparation of the dispersant is designated as the second polyol. Both the first and second polyols may referred to at various times as "base polyols". In one aspect of the invention, both the first and second polyols are polyoxyalkylene polyether polyols. They may also be the same or different polyoxyalkylene polyether polyols.

In one aspect of the invention, both the first polyol and the second polyol have a molecular weight of from about 500 to 15,000, preferably from about 2000 to 10,000, and are typically made by the reaction of an initiator having a plurality of reactive hydrogens thereon with one or more alkylene oxides. Suitable initiators include, but are not limited to, glycerin, alkanolamines, alkylamines, aryl or aromatic amines, sucrose, sorbitol, trimethylol propane (TMP) α-methylglucoside, β-methylglucoside or other methylglucoside, resins of phenol, aniline and mixed phenol aniline, such as methylenedianiline or bisphenol A, Mannich condensates and mixtures thereof, for example. The first or second polyol may be made by alkoxylating the initiator with a desired number of moles of an alkylene oxide. Preferably, the alkylene oxide has two to four carbon atoms, and is thus ethylene oxide, propylene oxide, butylene oxide or mixtures of these oxides. In one aspect of the invention, propylene oxide is particularly preferred. The oxides may be mixed upon addition, or may be added to the polyol initiator chain separately to form blocks or caps. In a preferred aspect, a mixture of ethylene oxide and propylene oxide are added to the initiator. The alkoxylation may or may not be catalyzed; KOH is a commonly used catalyst, although others may be employed. For example, double metal cyanide catalysts may be employed, in particular zinc hexacyanocobaltate, and the polyols may be prepared in accordance with the methods described in U.S. Pat. Nos. 3,029,505; 3,900,518; 3,941,049 and 4,355,100, incorporated by reference herein.

A reaction temperature of from about 60° to 150° C. is representative for the making of the dispersants, although it will be appreciated that other conditions may be advantageously employed. In one aspect, the monomer content relative to the second polyol is in the range of about 5 to 90 wt. % in from about 95 to about 10 wt. % of the second polyol, and is preferably in the range of about 10 to 50 wt. % in from about 90 to about 50 wt. % of the second polyol. It is conceivable that higher molecular weight modified polyols could be prepared by the methods of this invention.

Without dispersants or other special techniques, typical conventional SAN ratios could only reach as high as the range of about 60/40–65/35. In contrast, the SAN ratios that can be supported by the polymer polyols of the present invention using polyacrylate graft-polyol dispersants range from greater than 60/40 to about 85/15, more commonly being in the range of about 65/35 to about 75/25. The viscosities available with the method of this invention are less than those made using only polyoxylalkylene polyether polyols as the base polyol with no dispersant. A smaller average particle size of the dispersed solid is also obtained, as well as enhanced dispersion stability.

The base polyol has already been described. In making the final polymer polyol, the base or first polyol is the major portion of the polyol material used, whereas the dispersant is a minor portion of the total polyol material used. The weight percentage of dispersant to the total of (1) the base polyol (including all portions, if multiple proportions are used), (2) the dispersant and (3) the monomer proportion, ranges from about 0.1 to about 20 weight percent, and preferably from about 1 to about 15 weight percent. The reactor may be a batch reactor, a semi-batch reactor or one or more continuous stirred tank reactors (CSTRs). A process which is capable of maintaining high agitation and a low monomer to polyol ratio throughout the process is preferred.

In making the final polymer polyol dispersant, in one aspect, all of the dispersant is added in the reactor charge, and it is preferred that a majority of the dispersant is added in the reactor charge. In turn, it is preferred that a majority of the polyol employed be added in the feed stream, rather than the reactor charge. A plurality of CSTR reactors in series could be employed if the feed to the first CSTR had the higher dispersant proportion fed to it and its product fed into a second CSTR which also received the feed stream. A relatively high concentration of dispersant is preferably initially charged to the reactor to achieve the polymer polyols of the present invention.

The preferred dispersants of this invention are expected to produce polymer polyols at solid levels of up to 40%, and perhaps higher. Typically, these solids levels range from about 15–30%. The preparation of the polymer polyols of the present invention may be performed by polymerizing an ethylenically unsaturated monomer or mixture of monomers in a polyol mixture comprising at least one polyoxyalkylene polyol and a polyacrylate graft-polyol dispersant in the presence of a free radical initiator at a temperature in the range of 60° to 150° C., preferably in the range of about 100° to 130° C. Any suitable addition time of the feed stream to the reactor contents may be employed, for example, the addition time may range from 0.5 to 4.0 hours, preferably 1 to 2.5 hours. The proportion of the polymerization initiator as a wt. % of the total reactants may range from 0.05 to 5.0 wt. %, preferably 0.1 to 1.0 wt. %. The weight ratio of total monomer or monomer mixture (or disperse phase) to polyol (or continuous phase) will be from about 1:19 to about 9:11.

The preferred monomers employed in the method and polymer polyols of the present invention are both styrene and acrylonitrile to make a copolymer. The relative proportions of styrene to acrylonitrile, the SAN ratio, has been discussed above and will be exemplified below, although it is anticipated that SAN ratios of up to 85/15 may be developed in some aspects of this invention. Other suitable monomers include, but are not limited to, butadiene, isoprene, 1,4-pentadiene, 1,6-hexadiene, 1,7-octadiene, styrene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, substituted styrenes such as cyanostyrene, nitrostryrene, N,N-dimethylaminostyrene, acetoxystyrene, methyl 4-vinylbenzoate, phenoxystyrene, p-vinyl diphenyl sulfide, p-vinylphenyl phenyl oxide, acrylic and substituted acrylic monomers such as acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl a-ethoxyacrylate, methyl a-acetoaminoacrylate, butyl acrylate, 2-ethylhexyl acrylate, phenyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, maleic anhydride, maleimide, N-substituted maleimides, such as N-phenylmaleimide and the like.

The polymerization initiator may be any suitable initiator for the particular monomers employed. Suitable catalytic initiators useful in producing the polymer polyol compositions of this invention are the free radical type of vinyl polymerization catalysts, such as the peroxides, persulfates, perborates, percarbonates, azo compounds, and the like. Specific examples include, but are not limited to, 2,2'-azo-bis-isobutyronitrile (AIBN), dibenzoyl peroxide, lauroyl peroxide, di-t-butyl peroxide, diisopropyl peroxide carbonate, t-butyl peroxy-2-ethylhexanoate, t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate, 2,2'-azo-bis(2-methylbutanenitrile) for example. Other suitable catalysts may be employed, of course.

Procedures for Measurements of Physical Properties of Polymer Polyols

Viscosities were measured using a Brookfield cone and plate viscometer, Spindle #CP-52, operated at 20 secs$^{-1}$ at 25° C.

Particle sizes were measured using a Coulter N4 Particle Size Analyzer with o-xylene or isopropyl alcohol as the dispersing media.

Centrifugable solids were determined by centrifuging a sample of the polymer polyol for about 24 hours at about 3300 rpm and 1470 radial centrifugal "g" forces. The centrifuge tube was then inverted and allowed to drain for 4 hours. The non-flowing cake at the bottom of the tube is reported as weight percent of the initial weight of the sample tested.

The dispersants and polymer polyols, methods for making the same, and polyurethane foams therefrom, of the invention herein will be further described with respect to the following illustrative examples.

EXAMPLES 1-7

The preparation of the polyacrylate dispersants of the present invention were conducted according to the following procedure unless otherwise noted. Into a two liter reactor fitted with a stirrer, condenser, thermometer and addition tube, and under a blanket of nitrogen, were charged the amounts of reactants described in Table I. After heating the reactor charge to the reaction temperature, the feed charge was added over the indicated time period. Upon completion of the addition, the reaction product was held at the indicated reaction temperature for 0.5 to 1.0 hour, and then stripped of residual monomers for 1.0 hour at 115°-125° C. and at less than 5 mmHg.

the polyacrylate graft-polyol dispersant under a blanket of nitrogen. After heating the reactor charge to reaction temperature, the feed charge or stream was added over the indicated time period to give a milk-white polymer polyol. Upon completion of the addition, the polymer polyol was held at the indicated reaction temperature for from 0.5 to 1.0 hours, the soak time or digest time, and then the reaction mixture was stripped for 1.5 to 2.5 hours at about 90° to 120° C. at less than 5 mmHg to yield the polymer polyols.

For examples 8–18, the initiator was Vazo 67, and the

TABLE I
PREPARATION OF POLYACRYLATE GRAFT-POLYOL DISPERSANTS

| | Example No. | | | | | | |
|---|---|---|---|---|---|---|---|
| | 1 | 2 | 3 | 4 | 5 | 6 | 7 |
| Monomer Composition | Ethyl Acrylate/ n-Butyl Acrylate | → | → | → | → | n-Butyl Acrylate | 1 |
| Monomer Wt. Ratio | 50/50 | 50/50 | 50/50 | 50/50 | 50/50 | 100 | 37.5/37.5/25 |
| Base Polyol | ARCOL ® 5613 | ARCOL 1130 | Thanol ® SF-5505 | Thanol SF-5507 | 2 | ARCOL 1130 | ARCOL 1130 |
| Reaction Temp., °C. | 122 | 123 | 121 | 123 | 122 | 120 | 120 |
| Initiator Conc., Wt. % | 1.0 | 1.0 | 1.0 | 1.0 | 1.0 | 1.0 | 1.0 |
| Feed, Addition Time, hr. | 1.0 | 1.5 | 1.5 | 1.5 | 1.75 | 1.5 | 1.5 |
| Reactor Charge, g. Base Polyol | 100 | 100 | 100 | 100 | 100 | 100 | 100 |
| Feed Charge, g. | | | | | | | |
| Monomers | 400 | 400 | 400 | 400 | 400 | 400 | 400 |
| VAZO 67 | 10.0 | 10.0 | 10.0 | 10.0 | 10.0 | 10.0 | 10.0 |
| Base Polyol | 500 | 500 | 500 | 500 | 500 | 500 | 500 |
| Monomer Conv., % | 97 | 94 | 97 | 96 | 93 | 96 | 95 |
| Viscosity, cps, 5/sec | 2950 | 2950 | 5110 | 8300 | 18,200 | 1810 | 8160 |

[1] Ethyl Acrylate/n-Butyl Acrylate/ Methyl Methacrylate
[2] A glycerin initiated polyether of propylene oxide capped with ethylene oxide containing 7% ethylene oxide and having a hydroxyl number of 16 and an unsaturation content of 0.010 meq/g.

EXAMPLES 8–18

All the polymer polyols prepared according to the method of the invention incorporated some version of the following experimental procedure, unless otherwise specified. Into a 3 liter, 4-neck resin kettle equipped with stirrer, condenser, thermometer, addition tube, were charged the indicated amounts of base polyol and digestion time was 0.5 hours. The formulations give good polymer polyols at a SAN ratios of up to 75/25. Higher ratios could be expected with more optimization. Note also that the resulting polymer polyols have relatively low viscosities. The polymer polyol of Example 14 in particular has a high solids content of 40 wt. %.

TABLE II
PREPARATION OF POLYMER POLYOLS

| | Example No. | | | | | | |
|---|---|---|---|---|---|---|---|
| | 8 | 9 | 10 | 11 | 12 | 13 | 14 |
| Monomer Charge Wt. % | 20 | 20 | 20 | 30 | 30 | 35 | 40 |
| SAN Weight Ratio | 75/25 | 75/25 | 75/25 | 70/30 | 70/30 | 70/30 | 70/30 |
| Base Polyol | ARCOL ® 5613 | → | → | → | → | → | → |
| Dispersant from Ex. | 1 | 1 | 1 | 1 | 5 | 5 | 5 |
| % of Total Polyol Feed | 88 | 94 | 94 | 93 | 94 | 94 | 93 |
| Reaction Temp., °C. | 120 | 120 | 120 | 120 | 120 | 120 | 120 |
| Initiator Conc., Wt. % | 0.5 | 0.5 | 0.5 | 0.5 | 0.5 | 0.6 | 0.69 |
| Feed, Addition Time, hr. | 2.0 | 2.0 | 2.0 | 2.0 | 2.0 | 2.0 | 2.0 |
| Feed Charge, g. | | | | | | | |
| Styrene | 300 | 300 | 300 | 420 | 420 | 490 | 560 |
| Acrylonitrile | 100 | 100 | 100 | 180 | 180 | 210 | 240 |
| VAZO 67 | 10.0 | 10.0 | 10.0 | 10.0 | 10.0 | 12.0 | 13.7 |
| Base Polyol | 1400 | 1500 | 1500 | 1300 | 1316 | 1221 | 1120 |
| Reactor Charge, g. | | | | | | | |
| Base Polyol | — | — | 50 | — | 42 | 40 | 40 |
| Dispersant | 200 | 100 | 50 | 100 | 42 | 39 | 36 |
| Polymer Polyol Properties | | | | | | | |
| Overall Monomer Conv., % | 95 | 94 | 94 | 9b | 96 | 97 | 98 |
| Viscosity, cps, | 1400 | 1180 | 1240 | 2510 | 2240 | 3460 | 7340 |
| Particle Size, μ | 0.93 | 1.22 | 2.06 | 1.95 | 1.04 | 1.08 | 1.32 |

TABLE II-continued
PREPARATION OF POLYMER POLYOLS

| | Example No. | | | | | | |
|---|---|---|---|---|---|---|---|
| | 8 | 9 | 10 | 11 | 12 | 13 | 14 |
| Centrifugable Solids, Wt. % | 2.5 | 6.5 | 12.1 | 8.9 | 2.2 | 3.0 | 14.6 |

TABLE III
PREPARATION OF POLYMER POLYOLS

| | Example No. | | | |
|---|---|---|---|---|
| | 15 | 16 | 17 | 18 |
| Monomer Charge Wt. % | 20 | 20 | 20 | 20 |
| SAN Weight Ratio | 70/30 | 75/25 | 70/30 | 75/25 |
| Base Polyol | ARCOL ® 1130 | → | → | Thanol ® SF-5505 |
| Dispersant from Ex. | 2 | 2 | 2 | 3 |
| % of Total Polyol Feed | 94 | 94 | 88 | 90 |
| Reaction Temp., °C. | 120 | 120 | 120 | 120 |
| Initiator Conc., Wt. % | 0.5 | 0.5 | 0.5 | 0.25 |
| Feed, Addition Time, hr. | 2.0 | 2.0 | 2.0 | 2.0 |
| Feed Charge, g. | | | | |
| Styrene | 280 | 300 | 280 | 300 |
| Acrylonitrile | 120 | 100 | 120 | 100 |
| VAZO 67 | 10.0 | 10.0 | 10.0 | 5.0 |
| Base Polyol | 1500 | 1500 | 1400 | 1440 |
| Reactor Charge, g. | | | | |
| Base Polyol | — | — | — | 100 |
| Dispersant | 100 | 100 | 200 | 60 |
| Polymer Polyol Properties | | | | |
| Overall Monomer Conv., % | 91 | 90 | 93 | 93 |
| Viscosity, cps, | 1380 | 1190 | 1480 | 2280 |
| Particle Size, μ | 1.00 | 0.93 | 0.67 | 1.00 |
| Centrifugable Solids, Wt. % | 2.2 | 9.1 | 1.8 | 3.0 |

PREPARATION OF POLYURETHANE FOAMS

The polymer polyols prepared in accordance with the above examples may then be incorporated into a formulation which results in a polyurethane product. The polymer polyol of the invention may be used in conjunction with a polyisocyanate or may be combined with additional polyols well known in the art, and reacted with a polyisocyanate to form a slab polyurethane foam product. In these particular examples showing the utility of the polymer polyols of the present invention, polyurethane foams are produced. It will be shown that the polymer polyols of the present invention may also be blended with conventional polyols.

In order to form the polyurethane foam, a catalyst useful in preparing foams of this type is employed in the usual manner. Such catalyst may include those mentioned above, or one or more of the following:

(a) Tertiary amines such as trimethylamine, triethylamine, N-methylmorpholine, N-ethylmorpholine, N,N-dimethylbenzylamine, N,N-diemethylethanolamine, N,N,N',N'-tetramethyl-1,3-butanediamine, N,N-dimethylpiperazine, 1,4-diazobicyclo[2.2.2.]octane and the like;

(b) Tertiary phosphines such as trialkylphosphines, dialkylbenzylphosphines, and the like;

(c) Strong bases such as alkali and alkaline earth metal hydroxides, alkoxides, and phenoxides;

(d) Acidic metal salts of strong acids such as ferric chloride, stannic chloride, stannous chloride, antimony trichloride, bismuth nitrate and chloride, and the like;

(e) Chelates of various metals such as those which can be obtained from acetylacetone, benzoylacetone, trifluoroacetyl acetone, ethyl acetoacetate, salicyclaldehyde, cyclopentanone-1-carboxylate, acetylacetoneimine, bisacetylacetonealkylenediamines, salicyclaldehydeimine, and the like, with various metals such as Be, Mg, Zn, Cd, Pd, Ti, Zr, Sn, As, Bi, Cr, Mo, Mn, Fe, Co, and Ni;

(f) Alcoholates and phenolates of various metals such as $Ti(OR)_4$, $Sn(OR)_4$, $Al(OR)_3$, and the like, wherein R is alkyl or aryl, and the reaction products of alcoholates with carboxylic acids, beta-diketones, and 2-(N,N-dialkylamino)alkanols;

(g) Salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and (h) Organometallic derivatives of tetravalent tin, trivalent and pentavalent As, Sb, and Bi and metal carbonyls of iron and cobalt.

Of course, combinations of any of the above polyurethane catalysts may be employed. Usually, the amount of catalyst employed ranges from about 0.01 to about 5.0 parts by weight percent based on 100 parts by weight of the polyol. More often the amount of catalyst used is 0.2 to 2.0 parts by weight.

As is well known, the polyol component for the polyurethane foam is reacted in the presence of one or more of the above catalysts with a polyisocyanate according to conventional procedures. The polyisocyanate used may be any aromatic or aliphatic polyisocyanate, such as toluene diisocyanates, polymeric isocyanates and aliphatic diisocyanates. Typical aromatic polyisocyanates include, but are not limited to, m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4- isocyanatophenyl)-methane, bis(3-methyl-4-isocyanatophenyl)methane, and 4,4'-diphenylpropane diisocyanate. Suitable aliphatic diisocyanates would include isophorone diisocyanate, hexamethylene diisocyanate and methylene-bis-cyclohexylisocyanate. Toluene diisocyanates are preferred.

Aromatic polyisocyanates suitable for use include methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyisocyanates and corresponding methylene-bridged polyphenyl polyisocyanates therefrom are described in the literature and in many patents: for example, U.S. Pat. Nos. 2,683,730; 2,950,263; 3,012,008; 3,344,162; and 3,362,979.

Often, the most preferred methylene-bridged polyphenyl polyisocyanate mixtures used here contain from about 20 to about 100 wt. % methylene diphenyl diisocyanate isomers with the remainder being polymethylene polyphenyl diisocyanates having higher functionalities and higher molecular weights. Typical of these are polyphenyl polyisocyanate mixtures containing about 20 to 100 wt. % methylene diphenyl diisocyanate isomers, of which 20 to about 95 wt. % thereof is the 4,4'-isomer with the remainder being polymethylene polyphenyl polyisocyanates of higher molecular weight and functionality that have an average functionality of from about 2.1 to about 3.5. The isocyanate mixtures are known, commercially available materials and can be prepared by the process described in U.S. Pat. No. 3,362,979, issued Jan. 9, 1968 to Floyd E. Bentley.

Foaming is carried out in the presence of water and, optionally, additional organic blowing agents. The water is normally used in amounts of 0.5 to 15 parts by weight, preferably, 1.0 to 10 parts by weight (pbw) based on 100 parts by weight of the polymer polyol and any additional polyol present. The organic blowing agents optionally used along with the water are known in the art and are, for example, monofluorotrichloromethane, difluorodichloromethane, methylene dichloride and others generally known in the art. Additives to regulate the cell size and the cell structure, for example, silicone surfactant such as dimethylpolysiloxanes, may also be added to the foaming mixture. Fillers, flame retarding additives, dyes or plasticizers of known types may also be used. These and other additives are well known to those skilled in the art.

The use of the polymer polyols of the invention in making slab polyurethane foams will be illustrated with the aid of the following examples. These examples are intended to illustrate the invention, but are not intended to delineate the expected scope of the invention.

Procedure: The polyurethane foam was separately prepared by charging the amounts of polyol, polymer polyol, water, catalysts, silicone surfactant, and flame retardant compound indicated into a one-liter cylindrical container equipped with a mechanical stirrer. The mixture was stirred for about 30 seconds at about 2500 rpm, and the indicated amount of polyisocyanate was introduced into the container with stirring for about 10 seconds. The contents of the container were then immediately poured into a cardboard cake box and the foam was allowed to rise. After the foam rise was completed, the foam was allowed to cure at room temperature for about one week.

EXAMPLES 19 and 20

This example will show the use of the polymer polyol of Examples 15 and 17 in the preparation of slab polyurethane foams. These examples demonstrate that polyurethane foams with good load bearing properties may be made with the polymer polyols of the present invention. Both foams used the following formulation:

| FORMULATION | parts by wt. |
|---|---|
| ARCOL ® 1130 | 60 |
| Polymer Polyol | 40 |
| Water | 4.2 |
| Niax 5750 Surfactant[1] | 1 |
| Niax A-200 Catalyst[2] | 0.23 |
| T-9 Catalyst[3] | 0.15 |
| Thermolin 101 Flame Retardant[4] | 10 |
| TDI Index | 108 |

[1]Silicon surfactant, made by Union Carbide Corp.
[2]Amine catalyst, made by Union Carbide Corp.
[3]Organotin catalyst, made by Air Products and Chemicals, Inc.
[4]Tetrakis(2-Chloroethyl)Ethylene Diphosphate, made by Olin Corporation

TABLE III

Slab Polyurethane Foam Preparation

| | Foam Example No. | |
|---|---|---|
| | 19 | 20 |
| Polymer Polyol # | 15 | 17 |
| Foam Reactivity | | |
| Cream Time, sec. | 7 | 7 |
| Peak Rate, in./min. | 0.75 | 0.79 |
| Cell Openness, % | 80 | 80 |
| Density, PCF (lb./ft$^3$) | 1.88 | 1.77 |
| Air Flow, CFM (ft$^3$/min.) | 2.57 | 2.93 |
| Tensile Strength, PSI (lb./in.$^2$) | 14.3 | 15.1 |
| Elongation, % | 134 | 158 |
| Tear Strength, PLI (lb./linear in.) | 1.69 | 2.43 |
| Compression Set, 90% | 12 | 11.3 |
| HACS[1], 90% | 10.2 | 11.9 |
| CFD, 25% | 0.615 | 0.53 |
| CFD, 40% | 0.66 | 0.56 |
| CFD, 65% | 1.18 | 0.98 |
| CFD, 25% Ret. | 0.415 | 0.35 |
| GCFD[2], 25% | 0.33 | 0.30 |
| Sag Factor | 1.92 | 1.85 |
| Recovery, % | 67.48 | 66.04 |

[1]Humid Age Compression Set
[2]Guide Compression Force Deflection

GLOSSARY

| | |
|---|---|
| ARCOL ® 1130 | A glycerin initiated polyether of propylene oxide and ethylene oxide having a hydroxyl number of 48 and containing essentially secondary hydroxyl groups, made by ARCO Chemical Company. |
| ARCOL 5613 | A glycerin initiated polyether of propylene oxide and ethylene oxide having a hydroxyl number of 56 and containing essentially secondary hydroxyl groups, made by ARCO Chemical Company. |
| THANOL ® SF-5505 | A glycerin initiated polyether of propylene oxide and ethylene oxide with a hydroxyl number of 34 and a primary hydroxyl group content of 80% based on the total hydroxyl content of the polyether, made by ARCO Chemical Company. |
| THANOL SF-5507 | A glycerin initiated polyether of propylene oxide and ehtylene oxide modified with the diglycidyl ether of |

| | |
|---|---|
| | GLOSSARY-continued |
| | bisphenol A, with a hydroxyl number of 34 and a primary hydroxyl group content of 80% based on total hydroxyl content of the polyether, made by ARCO Chemical Company. |
| Vazo 67 | 2,2'-Azobis(2-methylbutanenitrile) polymerization catalyst made by E. I. duPont de Nemours and Co. |

Thus, it is apparent that the use of polyacrylate graft-polyol dispersants in the preparation of polymer polyols results in the ability to use higher SAN weight ratios, and higher polymer solids contents along with acceptable viscosities. The use of polyacrylate graft-polyols as dispersants results in polymer polyols having higher styrene contents, and improved stability and viscosity properties.

Many modifications may be made in the polymer polyols of this invention and their method of production without departing from the spirit and scope of the invention, which is defined only in the appended claims. For example, one skilled in the art could adjust the temperature, pressure, reactants, proportions and modes of addition within the parameters set forth to provide polymer polyols with particularly advantageous properties, or polymer polyols that give foams with optimal properties.

We claim:

1. Stable, low viscosity polymer polyols made by a process comprising polymerizing, via a free-radical reaction, a vinyl monomer component, in the presence of a polyol mixture comprising a major portion of a base polyol and a minor portion of a polyacrylate graft-polyol as a dispersant, where the polyacrylate graft-polyol dispersant is made by polymerizing at least one acrylate monomer in the presence of a polyol in which the resulting polymer from the acrylate monomer is soluble, and where the polyacrylate graft-polyol dispersant is employed in an amount within the range of from about 0.1 to about 20 weight percent based on the total weight of the vinyl monomer and the polyol mixture.

2. The stable, low viscosity polymer polyols of claim 1 where the polyacrylate graft-polyol dispersant is made by polymerizing from about 5 to 90 weight percent of at least one acrylate monomer in from about 95 to about 20 weight percent of a polyoxyalkylene polyether polyol to form the polyacrylate graft-polyol dispersant.

3. The stable, low viscosity polymer polyols of claim 2 where the acrylate monomer is selected from the group consisting of $C_1$-$C_{20}$ alkyl esters of acrylic and methacrylic acids.

4. The stable, low viscosity polymer polyols of claim 1 where the polyacrylate graft-polyol dispersant is made by polymerizing from about 10 to 50 weight percent of at least one acrylate monomer in from about 90 to about 50 weight percent of a polyoxyalkylene polyether polyol to form the polyacrylate graft-polyol dispersant.

5. The stable, low viscosity polymer polyols of claim 1 where the acrylate monomer is selected from the group consisting of ethyl acrylate, butyl acrylate and mixtures thereof.

6. The stable, low viscosity polymer polyols of claim 1 where the polyacrylate graft-polyol dispersant is employed in an amount within the range of from about 1 to about 15 weight percent based on the total weight of the vinyl monomer and the polyol mixture.

7. The stable, low viscosity polymer polyols of claim 1 where the weight ratio of the vinyl monomer component to the base polyol is within the range from about 1:19 to about 9:11.

8. The stable, low viscosity polymer polyols of claim 1 where the base polyol and the polyol employed in making the polyacrylate graft-polyol dispersant are the same polyol, which is a polyoxyalkylene polyether polyol.

9. The stable, low viscosity polymer polyols of claim 1 where the vinyl monomer component is styrene/acrylonitrile.

10. The stable, low viscosity polymer polyols of claim 9 where the ratio of styrene to acrylonitrile greater than 60/40.

11. The stable, low viscosity polymer polyols of claim 1 where the vinyl monomer component is styrene/N-phenylmaleimide.

12. The stable, low viscosity polymer polyols of claim 1 where the vinyl monomer component is styrene/N-phenylmaleimide/acrylonitrile.

13. The stable, low viscosity polymer polyols of claim 1 where the base polyol is a polyoxyalkylene polyether polyol having a molecular weight within the range of from about 500 to about 15,000.

14. The stable, low viscosity polymer polyols of claim 1 where the base polyol is a polyoxyalkylene polyether polyol having a molecular weight within the range of from about 2,000 to about 10,000.

15. The stable, low viscosity polymer polyols of claim 1 where said polymer polyols have a particle size of about 5.0 $\mu$m or less.

16. Stable, low viscosity polymer polyol compositions comprising a continuous phase, a disperse phase within the continuous phase, and a dispersant for enhancing the stability of the polymer polyol, wherein
   (a) the disperse phase consists of vinyl polymer particles formed by polymerizing an ethylenically unsaturated monomer or mixture of monomers in the continuous phase;
   (b) the continuous phase consists of a first polyoxyalkylene polyether polyol; and
   (c) the dispersant is a polyacrylate graft-polyol formed by polymerizing from about 5 to about 90 weight percent of at least one acrylate monomer selected from the group consisting of $C_1$-$C_{20}$ alkyl esters of acrylic and methacrylic acids in from about 95 to about 10 weight percent of a second polyoxyalkylene polyether polyol to form a single phase homogeneous liquid polyacrylate graft-polyol dispersant, said polyacrylate graft-polyol dispersant being employed in an amount within the range of from about 0.1 to about 20 weight percent based on the total weight of the vinyl monomer and the polyol mixture.

17. The stable, low viscosity polymer polyols of claim 16 where the polyacrylate graft-polyol dispersant is made by polymerizing from about 10 to 50 weight percent of at least one acrylate monomer in from about 90 to about 50 weight percent of a polyoxyalkylene polyether polyol to form the polyacrylate graft-polyol dispersant.

18. The stable, low viscosity polymer polyols of claim 16 where the acrylate monomer is selected from the group consisting of ethyl acrylate, butyl acrylate and mixtures thereof.

19. The stable, low viscosity polymer polyols of claim 16 where the polyacrylate graft-polyol dispersant is employed in an amount within the range of from about 1 to about 15 weight percent based on the total weight of the vinyl monomer and the polyol mixture.

20. The stable, low viscosity polymer polyols of claim 16 where the weight ratio of the vinyl monomer component to the base polyol is within the range from about 1:19 to about 9:11.

21. The stable, low viscosity polymer polyols of claim 16 where the vinyl monomer component is styrene/acrylonitrile.

22. A method for making stable, low viscosity polymer polyols comprising the steps of:

polymerizing at least one acrylate monomer in the presence of a first polyol in which the resulting polymer is soluble to give a polyacrylate graft-polyol dispersant; and polymerizing, via a free-radical reaction, a vinyl monomer component in the presence of a polyol mixture comprising a major portion of a base polyol and a minor portion of the polyacrylate graft-polyol dispersant; where the polyacrylate graft-polyol dispersant is employed in an amount within the range of from about 0.1 to about 20 weight percent based on the total weight of the vinyl monomer and the polyol mixture.

23. The method of claim 22 where from about 5 to 90 weight percent of at least one acrylate monomer in from about 95 to about 10 weight percent of a polyoxyalkylene polyether polyol is used to form the polyacrylate graft-polyol dispersant.

24. The method of claim 23 where the acrylate monomer is selected from the group consisting of $C_1-C_{20}$ alkyl esters of acrylic and methacrylic acids.

25. The method of claim 22 wherein the polymerization of the vinyl monomer is conducted in a reactor, a majority of the dispersant is present in an initial charge to the reactor and a majority of the base polyol is present in a feed stream to the reactor.

26. The method of claim 22 where from about 10 to 50 weight percent of at least one acrylate monomer in from about 90 to about 50 weight percent of a polyoxyalkylene polyether polyol is used to form the polyacrylate graft-polyol dispersant.

27. The method of claim 22 where the polyacrylate graft-polyol dispersant is employed in an amount within the range of from about 1 to about 15 weight percent based on the total weight of the vinyl monomer and the polyol mixture.

28. The method of claim 22 where the weight ratio of the vinyl monomer component to the base polyol is within the range from about 1:19 to about 9:11.

29. The method of claim 22 where the base polyol and the first polyol employed in making the polyacrylate graft-polyol dispersant are the same polyol, which is a polyoxyalkylene polyether polyol.

30. The method of claim 22 where the base polyol is a polyoxyalkylene polyether polyol having a molecular weight within the range of from about 2,000 to about 10,000.

31. A method of stabilizing a polymer polyol comprising vinyl polymer particles dispersed in a continuous polyether polyol phase against phase separation, the method comprising incorporating into the polymer polyol composition from about 0.1 to about 20 weight percent of a polyacrylate graft-polyol dispersant formed by polymerizing from about 5 to about 90 weight percent of at least one acrylate monomer selected from the group consisting of $C_1-C_{20}$ alkyl esters of acrylic and methacrylic acids in from about 95 to about 10 weight percent of a polyoxyalkylene polyether polyol to form a single phase homogeneous liquid polyacrylate graft-polyol dispersant.

32. The method of claim 31 where from about 10 to 50 weight percent of at least one acrylate monomer in from about 90 to about 50 weight percent of a polyoxyalkylene polyether polyol is used to form the polyacrylate graft-polyol dispersant.

33. The method of claim 31 where the polyacrylate graft-polyol dispersant is employed in an amount within the range of from about 1 to about 15 weight percent based on the total weight of the vinyl monomer and the polyol mixture.

34. The method of claim 31 where the weight ratio of the vinyl monomer component to the base polyol is within the range from about 1:19 to about 9:11.

35. The method of claim 31 where the base polyol and the first polyol employed in making the polyacrylate graft-polyol dispersant are the same polyol, which is a polyoxyalkylene polyether polyol.

36. The method of claim 31 where the base polyol is a polyoxyalkylene polyether polyol having a molecular weight within the range of from about 2,000 to about 10,000.

* * * * *